(12) United States Patent
Angelskaar

(10) Patent No.: US 7,381,264 B2
(45) Date of Patent: *Jun. 3, 2008

(54) ADMIXTURE

(75) Inventor: Terje Angelskaar, Zürich (CH)

(73) Assignee: Construction Research & Technology GmbH., Trostberg (DE)

( * ) Notice: Subject to any disclaimer, the term of this patent is extended or adjusted under 35 U.S.C. 154(b) by 76 days.

This patent is subject to a terminal disclaimer.

(21) Appl. No.: 10/557,078

(22) PCT Filed: May 26, 2004

(86) PCT No.: PCT/EP2004/005647

§ 371 (c)(1),
(2), (4) Date: Nov. 17, 2005

(87) PCT Pub. No.: WO2004/106258

PCT Pub. Date: Dec. 9, 2004

(65) Prior Publication Data

US 2007/0062417 A1    Mar. 22, 2007

(30) Foreign Application Priority Data

May 30, 2003 (GB) ................... 0312293.4
Oct. 31, 2003 (GB) ................... 0325361.4

(51) Int. Cl.
*C04B 22/14* (2006.01)
*C04B 24/04* (2006.01)
*C04B 103/14* (2006.01)
*B05D 1/02* (2006.01)

(52) U.S. Cl. .............. 106/823; 106/717; 106/727; 106/801; 106/808; 106/819; 427/427; 427/427.1

(58) Field of Classification Search ......... 106/727, 106/808, 823, 717, 801, 819; 427/427, 427.1
See application file for complete search history.

(56) References Cited

U.S. PATENT DOCUMENTS

| | | | |
|---|---|---|---|
| 4,507,154 A | 3/1985 | Burge et al. | |
| 4,559,243 A | 12/1985 | Passier et al. | |
| 5,911,819 A | 6/1999 | Drs et al. | |
| 5,935,318 A | 8/1999 | Angelskaar et al. | |
| 5,997,630 A | 12/1999 | Angelskaar et al. | |
| 6,302,954 B1 | 10/2001 | Lunkenheimer et al. | |
| 6,537,367 B2 | 3/2003 | Sommer et al. | |
| 6,540,826 B2 | 4/2003 | Sommer et al. | |
| 6,692,564 B2 | 2/2004 | Hofmann | |
| 6,723,163 B1 | 4/2004 | Hoffmann | |
| 7,182,808 B2 * | 2/2007 | Angelskaar et al. | 106/823 |
| 7,198,669 B2 * | 4/2007 | Angelskaar et al. | 106/823 |
| 2002/0035952 A1 | 3/2002 | Sommer et al. | |

FOREIGN PATENT DOCUMENTS

| | | |
|---|---|---|
| EP | 0 465 991 A1 | 1/1992 |
| EP | 0 508 158 A2 | 10/1992 |
| EP | 0 798 300 | 10/1997 |
| WO | WO 96/05150 | 2/1996 |
| WO | WO 00/78688 A | 12/2000 |
| WO | WO 01/42165 A2 | 6/2001 |
| WO | WO 03/029163 A2 | 4/2003 |
| WO | WO 03/045872 A1 | 6/2003 |
| WO | WO 2005/028398 A1 | 3/2005 |

* cited by examiner

*Primary Examiner*—Anthony J Green
(74) *Attorney, Agent, or Firm*—Curatolo Sidoti Co., LPA; Joseph G. Curatolo; Salvatore A. Sidoti

(57) ABSTRACT

A liquid accelerator composition for sprayed concrete, comprising aluminium sulphate, amorphous aluminium hydroxide, alkanolamine and an organic dibasic acid anhydride. The compositions allow the attainment of high early compressive strength, and they can be tailored to give good performance with a wide variety of cement types.

17 Claims, No Drawings

ADMIXTURE

CROSS REFERENCE TO RELATED APPLICATIONS

This application is a national stage application of International Application No. PCT/EP2004/005647, filed 26 May 2004, which claims the benefit of Application No. GB 0312293.4, filed 30 May 2003 and GB 0325361.4, filed 31 Oct. 2003, from which applications priority is claimed.

This invention relates to the application of cementitious compositions by spraying and to accelerator compositions for use therein.

The use in cementitious compositions such as concrete to be applied by spraying of alkali-free accelerators (AFAs) in place of the traditional aluminates and other strongly alkaline materials is now well established. The major components of such accelerators are aluminium compounds, the most commonly encountered being aluminium sulphate and amorphous aluminium hydroxide. In addition to these aluminium compounds, a variety of other components have been used in such accelerators, these including alkanolamines, other aluminium salts (such as oxalates and nitrates) and various organic acids.

A major problem in the art is that the rate of hydration of the cement of such compositions is often slow between 1 and 8 hours after spraying. In extreme cases, there may be no hydration during this period. This means that the development of compressive strength, important for the integrity of the surface, is sometimes completely halted for long periods. This can result in dangerous conditions, for example, when the composition is sprayed on a rock face that is broken or fractured, the sprayed layer cannot ensure the integrity of the surface.

The invention therefore provides a liquid accelerator composition for sprayed concrete, comprising aluminium sulphate, amorphous aluminium hydroxide, alkanolamine and at least one of maleic acid, oxalic acid and an organic dibasic acid anhydride.

The invention further provides a method of spraying concrete on to a substrate comprising the steps of forming a concrete mix and conveying this to a spray nozzle for spraying on to the substrate, there being injected at the nozzle a liquid accelerator composition as hereinabove described.

Aluminium sulphate is well known as a component of AFAs, and any aluminium sulphate known to be useful in such a use may be used in this invention. One of the most common is so-called "17%" aluminium sulphate, $Al_2(SO_4)_3 \cdot 14.3H_2O$, so called because the proportion of aluminium oxide $Al_2O_3$ therein is 17%. This material is preferred largely because of its ready availability and good properties, but other aluminium sulphates may also be used. The aluminium hydroxide for use in the invention is amorphous aluminium hydroxide, of the type frequently used in AFAs.

Alkanolamines are known as components of AFAs. The preferred material for the purposes of this invention is diethanolamine. However, other alkanolamines, such as triethanolamine, may also be used.

Organic dibasic acid anhydrides are well-known and readily-available raw materials. The best known (and the best for the purposes of this invention) organic dibasic anhydride is maleic anhydride, encountered usually in the field of polymerisation. However, other such anhydrides, such as succinic anhydride, may also be used. The organic dibasic acid anhydrides provide an improvement setting time (high early strength) of the corresponding cement.

It is possible that the accelerator composition additionally contains maleic acid and/or oxalic acid.

The acids useful for this invention are oxalic acid and maleic acid. It has been found that the presence of at least one of these acids enhances the compressive strength of the sprayed concrete, both initial and final.

Although not an essential component, an especially preferred component is a water-soluble magnesium salt. Any such salt may be used, but the preferred salts are magnesium carbonate, or magnesium sulphate or mixtures of these salts. While the magnesium sulphate used in this invention may be any magnesium sulphate, the preferred magnesium is the hydrate $MgSO_4 \cdot 7H_2O$, known as Epsom Salts. The industrial grade of this material is acceptable for the purposes of this invention; it is not necessary to use the medicinal grade.

Further optional useful components are phosphor and oxygen containing inorganic acids, especially phosphorous acid ($H_3PO_3$) or phosphoric acid ($H_3PO_4$). It is also possible to use admixtures of different phosphor and oxygen containing inorganic acids—for example a mixture of phosphoric acid and phosphorous acid.

The proportions of the various components conform to the following proportion ranges, all of these being parts by weight:

| | |
|---|---|
| aluminium sulphate (17%) | 20-45 |
| aluminium hydroxide | 15-20 |
| water-soluble magnesium salt (e.g. magnesium sulphate) | 0-12 |
| organic dibasic acid anhydride | 0.5-6 |
| alkanolamine | 0.2-3.0 |
| $C_2$-$C_6$ dibasic acid | 0-8 |
| phosphor and oxygen containing inorganic acid (e.g. phosphorous acid) | 0-4 |

The accelerator composition is used in an aqueous solution. It is dissolved to form a solution of about 45-65% solids by weight and dosed into the concrete at the nozzle at a rate sufficient to give from 0.5 to 12% accelerator (active ingredients by weight on cement).

The accelerator compositions of the present invention confer a number of advantages. Firstly, they give early hydration, essential for the achievement of better rock support. They allow a better spraying pattern. This is because a sprayed cementitious composition containing this accelerator remains relatively fluid compared with that dosed with known accelerator (where it can be already partially dry when it hits the substrate), but it hardens more quickly. This has important practical implications; it means that the tendency to trap air or water under the hardening composition is minimised or even eliminated altogether, which means in turn that the integrity of the resulting sprayed layer is better. Thus, spraying on wet surfaces is not a problem, as it can be when other accelerators are used. In addition, it means that the sprayed composition goes more easily around reinforcing bars and grids, leading again to better integrity.

A further advantage is the ability to tailor the accelerator to any given cement type. Because they are manufactured from different local materials in different localities, cements around the world differ markedly in properties and behaviour with admixtures. For example, an accelerator that works well with a European cement, may not work very well with a US, Japanese or Australian cement. This invention allows the accelerator to be tailored to any given cement by varying the nature and proportions of the acids and acid anhydrides. The skilled person can make the necessary laboratory scale experiments to determine what works best in any given circumstances.

Finally, the accelerators of this invention allow the consistent achievement of a level of performance hitherto rarely reached. One recognised standard for sprayed concrete is contained in the Guidelines for Sprayed Concrete of the Oesterreichisher Betonverein (Austrian Concrete Society, hereinafter "OeBV"). The important OeBV requirements for strength of fresh (not older than 24 hours) sprayed concrete are found on p. 24 of the March 1999 edition. They define the performance by means of various plots of compressive strength (ordinate) against time (abscissa), the resulting curves being designated $J_1$, $J_2$ and $J_3$, in order of distance from the X-axis, and thus in order of performance and increasing desirability. Up to now, it has been difficult to attain the $J_3$ level when an AFA is used. It is a feature of the accelerators of this invention that this elevated performance level can be attained. The invention therefore provides a layer of hardening cementitious composition on a substrate, whose hardening has been accelerated by an accelerating composition as hereinabove defined and whose development of compressive strength against time conforms at least to the upper part of curve $J_2$ and curve $J_3$ of the OeVB Guidelines.

The invention is now further described with reference to the following non-limiting examples, in which all parts are expressed by weight.

EXAMPLES 1-3

Following AFA is prepared by mixing the components listed hereinunder.

|  | Example No. 1 | |
|---|---|---|
|  | No. 1a (according to the invention) | No. 1b (comparative example) |
| water | 37.5 | 35.5 |
| aluminium sulphate ($Al_2(SO_4)_3 \cdot 16H_2O$) | 28.0 | 28.0 |
| diethanolamine | 0.5 | 0.5 |
| magnesium sulphate ($MgSO_4 \cdot 7H_2O$) | 12.0 | 12.0 |
| maleic acid | — | 6.0 |
| maleic anhydride | 4.0 | — |
| oxalic acid dihydrate | — | — |
| amorphous aluminium hydroxide | 18.0 | 18.0 |

These are added at a concentration of 7% by weight actives on cement to test mortar mixes made up from cement (450 parts), sand of Sieve Line DIN 196-1 (1350 parts) and 0.6% (actives on cement) of a commercial polycarboxylate superplasticiser (GLENIUM™ 51 ex MBT), with a water/cement ratio of 0.4.

Test specimens of the mortars are made in accordance with European Standard EN 480-1, and they are tested for compressive strength according to EN 12390-3. A number of different combinations of cements and AFAs are used, as follows
Test Specimen A—British OPC (UK OPC: CEM I 42.5)+ Example No. 1a
Test Specimen B—Swedish sulphate-resistant OPC (SE OPC: CEM I 42.5 SR) with low sulphate content +Example 1a
Test Specimen C—Swedish OPC as above+Comparative Example 1b The results of the testing are as follows:

|  |  | Test Specimen | | |
|---|---|---|---|---|
|  |  | A | B | C (comparative) |
| Compressive strength (MPa) | 6 hours | 0.3 | 2.6 | 0.6 |
|  | 1 day | 22.1 | 11.7 | 15.2 |

A 6-hour compressive strength figure lower than 1 MPa is regarded as unacceptable.

The testing provides an interesting example of how the variation of cement type can affect the performance of AFAs. Specimens A and B both utilise the AFA of Example 1a (maleic anhydride) and they have very different performances, with Test Specimen B being acceptable and Test Specimen A not.

In addition the maleic acid-based test specimen C gives an unacceptable result with the Swedish OPC, whereas the maleic anhydride-based test specimen B gives an excellent 6-hour result. This shows that it makes a significant difference, if the acid or the corresponding acid anhydride is used.

To place these on the OeVB curves hereinabove mentioned,
Test Specimen A below $J_1$ (unacceptable)
Test Specimen B higher than $J_2$, approaching $J_3$ (good result)
Test Specimen C just above $J_1$ (unacceptable)

EXAMPLE NO. 2

| Aluminium sulfate ($Al_2(SO_4)_3 \cdot 16H_2O$) | 39 weight % |
|---|---|
| Diethanol amine | 0.5 weight % |
| Oxalic acid dihydrate | 3.0 weight % |
| Maleic anhydride | 3.0 weight % |
| Amorphous aluminium hydroxide | 18.0 weight % |
| Phosphorous acid | 2 weight % |
| Water | 34.5 weight % |

This mix provides a "8 hours compressive strength" of 3.3 MPa and a "one day compressive strengths" of 28.8 MPa when applied in European Standard EN-196 norm mortar (cement: Australian opc CEM I 42.5).

EXAMPLE NO. 3

| Aluminium sulfate ($Al_2(SO_4)_3 \cdot 16H_2O$) | 39 weight % |
|---|---|
| Diethanol amine | 0.5 weight % |
| Maleic acid | 6.0 weight % |
| Amorphous aluminium hydroxide | 18.0 weight % |
| Phosphorous acid | 2 weight % |
| Water | 34.5 weight % |

This mix provides a "8 hours compressive strength" of 0.3 MPa and a "one day compressive strengths" of 21.3 MPa when applied in European Standard EN-196 norm mortar (cement: Australian opc CEM I 42.5).

The "8 hours compressive strength" is deemed to be more important than the "one day compressive strength".

The composition according the example 2 provides positive results (especially the 8 hours value of the compressive strength) in connection with "Australian opc CEM I 42.5"

cement but the composition according to example 3 does not work very well with the same cement.

With some minor laboratory experimentation, the skilled person can readily find an accelerator to suit any given cement type and produce desirable results. This is essential, as cements are generally produced locally and can be completely different from each other.

What is claimed is:

1. A liquid accelerator composition for sprayed concrete, comprising aluminium sulphate, amorphous aluminium hydroxide, alkanolamine and an organic dibasic acid anhydride, in the following weight proportions:

| | |
|---|---|
| aluminium sulphate (17%) | 20-45 |
| aluminium hydroxide | 15-20 |
| alkanolamine | 0.2-3.0 |
| dibasic acid anhydride | 0.5-6. |

2. A liquid accelerator composition according to claim 1, wherein the composition additionally comprises a water-soluble magnesium salt.

3. A liquid accelerator composition according to claim 2, wherein the magnesium salt is magnesium carbonate or magnesium sulphate.

4. A liquid accelerator composition according to claim 1, wherein the composition additionally contains a phosphorus and oxygen containing inorganic acid.

5. A liquid accelerator composition according to claim 4, wherein the phosphorus and oxygen containing inorganic acid is phosphoric acid or phosphorous acid.

6. A liquid accelerator composition containing the following materials and weight proportions:

| | |
|---|---|
| aluminium sulphate (17%) | 20-45 |
| aluminium hydroxide | 15-20 |
| water-soluble magnesium salt | 0-12 |
| dibasic acid anhydride | 0.5-6 |
| alkanolamine | 0.2-3.0 |
| $C_2$-$C_6$ dibasic acid | 0-8 |
| phosphorus and oxygen containing inorganic acid | 0-4. |

7. A liquid accelerator according to claim 6, wherein the water-soluble magnesium salt is magnesium carbonate or magnesium sulphate.

8. A liquid accelerator according to claim 6, wherein the phosphorus and oxygen containing inorganic acid is phosphoric acid or phosphorous acid.

9. A liquid accelerator composition according to claim 2, wherein the composition additionally contains a phosphorus and oxygen containing inorganic acid.

10. A liquid accelerator composition according to claim 9, wherein the phosphorus and oxygen containing inorganic acid is phosphoric acid or phosphorous acid.

11. A liquid accelerator according to claim 7, wherein the phosphorus and oxygen containing inorganic acid is phosphoric acid or phosphorous acid.

12. The liquid accelerator composition according to claim 1, wherein the composition additionally comprises at least one of maleic acid or oxalic acid.

13. A method of spraying concrete on to a substrate comprising the steps of forming a concrete mix and conveying this to a spray nozzle for spraying on to the substrate, there being injected at the nozzle a liquid accelerator composition according to claim 1.

14. A method of spraying concrete on to a substrate comprising the steps of forming a concrete mix and conveying this to a spray nozzle for spraying on to the substrate, there being injected at the nozzle a liquid accelerator composition according to claim 2.

15. A method of spraying concrete on to a substrate comprising the steps of forming a concrete mix and conveying this to a spray nozzle for spraying on to the substrate, there being injected at the nozzle a liquid accelerator composition according to claim 4.

16. A method of spraying concrete on to a substrate comprising the steps of forming a concrete mix and conveying this to a spray nozzle for spraying on to the substrate, there being injected at the nozzle a liquid accelerator composition according to claim 9.

17. A method of spraying concrete on to a substrate comprising the steps of forming a concrete mix and conveying this to a spray nozzle for spraying on to the substrate, there being injected at the nozzle a liquid accelerator composition according to claim 6.

* * * * *